United States Patent
Stoeppelmann et al.

(10) Patent No.: US 7,151,127 B2
(45) Date of Patent: Dec. 19, 2006

(54) USE OF THERMOPLASTIC POLYAMIDE MOLDING COMPOSITIONS WITH REDUCED FORMATION OF SOLID DEPOSITS AND/OR COVERINGS

(75) Inventors: Georg Stoeppelmann, Bonaduz (CH); Ornulf Rexin, Domat/Ems (CH); Eduard Schmid, Bonaduz (CH); Ralph Kettl, Paspels (CH); Manfred Hewel, DOmat/Ems (CH)

(73) Assignee: Ems-Chemie AG, Domat/Ems (CH)

( * ) Notice: Subject to any disclaimer, the term of this patent is extended or adjusted under 35 U.S.C. 154(b) by 0 days.

(21) Appl. No.: 11/026,192

(22) Filed: Dec. 29, 2004

(65) Prior Publication Data
US 2005/0148728 A1    Jul. 7, 2005

(30) Foreign Application Priority Data
Dec. 30, 2003   (DE) ................................. 103 61 711

(51) Int. Cl.
*C08L 77/00*    (2006.01)
(52) U.S. Cl. ....................... 524/168; 252/500; 524/158; 524/169; 524/538; 524/606; 525/420; 525/432
(58) Field of Classification Search ................ 525/432, 525/420; 252/500; 524/168, 169, 158, 606, 524/538
See application file for complete search history.

(56) References Cited

U.S. PATENT DOCUMENTS

| | | | |
|---|---|---|---|
| 5,646,234 A * | 7/1997 | Jung et al. | 528/184 |
| 6,506,830 B1 | 1/2003 | Bussi et al. | 524/495 |
| 6,753,363 B1 | 6/2004 | Harashina | 524/99 |

FOREIGN PATENT DOCUMENTS

| | | |
|---|---|---|
| EP | 0 388 583 | 1/1990 |
| EP | 0469542 A2 * | 7/1991 |
| EP | 0748 847 | 12/1996 |
| WO | WO 97/10303 | 3/1997 |
| WO | WO 01/05888 | 1/2001 |

* cited by examiner

*Primary Examiner*—Ana Woodward
(74) *Attorney, Agent, or Firm*—J.C. Patents (57) ABSTRACT

The present invention relates to the use of thermoplastic polyamide moulding compositions with reduced or strongly reduced formation of solid deposits and/or coverings during a thermoplastic conversion into commodity goods in discontinuous processes in particular injection moulding, and continuous processes such as the extrusion of films, fibers, tubes and jacketings containing at least 20% by weight polyamide and/or at least one copolymer with at least 20% by weight polyamide components.

22 Claims, 1 Drawing Sheet

USE OF THERMOPLASTIC POLYAMIDE MOLDING COMPOSITIONS WITH REDUCED FORMATION OF SOLID DEPOSITS AND/OR COVERINGS

CROSS-REFERENCE TO RELATED APPLICATION

This application claims the benefit of priority German Patent Application No. 103 61 711.6 filed on Dec. 30, 2003, which is incorporated herein by reference in its entirety for all purposes.

BACKGROUND OF THE INVENTION

1. Field of the Invention

This invention relates in general to the use of thermoplastic polyamide moulding compositions with reduced or strongly reduced formation of solid deposits during thermoplastic conversion into commodity goods in discontinuous processes, in particular injection moulding, and continuous processes such as the extrusion of films, fibers, tubes and jacketings. The polyamide moulding compositions used are based on polyamides containing at least 20% by weight polyamide and/or copolymers with at least 20% by weight polyamide components. The present invention particularly relates to the use of thermoplastic polyamide 12 moulding compositions based on hydrolytically produced polyamide 12, which contains specific compounds in certain quantitative proportions in order to avoid or reduce the formation of monomer deposits. Such produced polyamide moulding compositions according to the present invention do not result in the usual solid deposits and/or during further processing in injection moulding or extrusion.

Polyamides in accordance with the invention are therefore considered polyamides, based on $C_6$–$C_{12}$-lactames or (ω-amino acids with 4 to 18 carbon atoms, preferably 6 to 12 carbon atoms, or polycondensation products are used, obtained from polycondensation of at least one diamine from the group of aliphatic diamines with 4 to 18 C atoms, cycloaliphatic diamines with 7 to 22 C atoms in combination with at least one dicarboxylic acid from the group of aliphatic dicarboxylic acids 4 to 44 C atoms, cycloaliphatic dicarboxylic acids with 8 to 24 C atoms and aromatic dicarboxylic acids with 8 to 20 C atoms.ω-aminocarboxylic acids or lactames are selected from the group consisting of ε-aminocapronic acid, 11-amino undecane acid, 12-aminododecane acid, ε-caprolactame, enantholactame, laurinlactame. In accordance with the invention it is further possible to use mixtures of those polymerisates or polycondensation products respectively. In accordance with the invention suitable diamines which are combined with a dicarboxylic acid are e.g. 2,2,4- or 2,4,4-trimethylhexamethylenediamine, 1,3- or 1,4-bis(aminomethyl)cyclohexane, bis(p-aminocyclohexyl)methane, m- or p-xylylenediamine, 1,4-diaminobutane, 1,5-diamino-2-methylpentane, 1,6-diaminohexane, 1,8-diaminooctane, 1,9-diaminononane, 2-methyl-1,8-diaminooctane, 1,10-diaminodecane, 1,12-diaminododecane, cyclohexyldimethylenediamine, and the dicarboxylic acids selected from the group of succinic acid, glutaric acid, adipic acid, suberic acid, pimelic acid, suberic acid, acelaic acid, sebacic acid, dodecanedicarboxylic acid, octadecanedicarboxylic acid, 4-cyclohexanedicarboxylic acid, terephthalic acid, isophthalic acid, and the naphthalene dicarboxylic acids.

Specific examples of the polyamides used in the context of the present invention and the additionally added (co)polyamides to the blends or alloys for the moulding compositions in accordance with the invention respectively, are therefore homo- and copolyamides from the group of PA 6, PA 66, PA 11, PA 46, PA 12, PA 1212, PA 1012, PA 610, PA 612, PA 69 PA 9T, PA 10T, PA 12T, PA 12I, mixtures thereof or copolymers based on monomers used. Preferred are, in accordance with the invention, also copolyamide PA 12T/12, PA 10T/12, PA 12T/106 and PA 10T/106. Furthermore are e.g. PA 6/66, PA 6/612, PA 6/66/610, PA 6/66/12, PA 6T/66, PA 6/6T, PA 6/6I, PA 6I/6T or mixtures thereof or mixtures such as PA 12/MACMI, PA 66/6I/6T, MXD 6/6 preferred polyamide moulding compositions as well.

In accordance with the invention the polyamide moulding compositions may also contain polyamide blockcopolymers, particularly polyamide 12-blockcopolymers which contain polyester-, polyether-, polysiloxane-, polycarbonate-, polyacrylate-, polymethacrylate- or polyolefin segments as further components beside a proportion of at least 20% polyamide components, particularly polyamide 12 components. Representatives of this class of polymers are polyether amides, polyetheresteramides und polyester amides:

2. Description of Related Art

In the state of equilibrium polyamide melts show certain concentrations of linear and, if necessary, cyclic monomers and linear and cyclic oligomers and also water. The low-molecular components have an influence on the processibility of the products. They lower the viscosity of the polymer melts. With injection moulding and extrusion processes residual monomers, particularly lactames, and cyclic oligomers may evaporate and may cause disturbance due to the formation of solid deposits and coverings (scales).

Therefore, like all polymers formed by step growth reactions, polyamides naturally contain low concentrations of rest monomers and oligomers.

In general, the monomers and/or oligomers are removed from the polyamide granulates by static or dynamic extraction with water, methanol, ethanol, ethanol/water or chloroform. Following DIN 53378 (German Industry Standard) and DIN ISO 6427 respectively, polyamide powders of specific grain size and certain conditions are to be extracted with methanol. The monomers always occur in a mixture with oligomers. Depending on type and molar mass, those can be removed more or less completely from the polyamides depending on extraction conditions.

With the amorphous, semi aromatic copolyamides comes the problem, that the extraction with common solvents such as methanol or methylenechloride does not produce considerable amounts of extraction due to the high glass transition temperature of the products and that the polymer material blends together when using high boiling points alcohols.

With the semi aromatic polyamides and the so-called HT (high temperature)-polyamides such as PA6I/6T, apart from residual monomers and oligomers, also the low-molecular decomposition products formed during production and processing must be considered with regard to deposit formation.

It is therefore desirable to remove or avoid the above mentioned low molecular components, so that no solid deposits or coverings will be formed in the following thermoplastic processing.

Polyamide 12 (PA 12) is a type of polyamide which is distinguished by it s property profile. Polyamide 12 can be modified in several ways, and the resulting moulding compositions are outstanding thermoplastics in injection moulding and convertible into valuable items of practical use in extrusion processes. Polyamide 12 corresponds to the type of polyamide the properties of which are the least influenced by changes in temperature and humidity.

One problem is that during the common hydrolytic polymerization process/autoclave treatment the monomer turnover is only 99.5% and the remaining residual lactame is hardly soluble in the polymer, so that, particularly in processing from melts, but also in the later use the lactam 12 (LC12) is sweat out and sublimed, especially on cooled faces, e.g. the surfaces of tools and prefabricated parts where it comes to the formation of deposits. Particularly due to the high melting point of lactam 12 those sublimates often form irritating deposits which, particularly when further additives migrate to the surface, give cause for processing troubles with surface damaging and production interruption. So-called "black spots" can also be formed. Well-known measures taken for reduction and elimination of the rest content of lactame 12 are, e.g. the melt- and solid phase after condensation including vacuum, liquid extraction processes or recrystallization from alcoholic solution. These processes where the lactame evaporates under thermal influence may as well be disrupted by the lactame sublimate. Furthermore the lactame smoke is highly inflammable and the processes require certain precautionary measures. Furthermore the additional thermal stress can damage the polymer. In thermoplastic processing of polyamide 12 (PA12) moulding compositions by injection moulding and by extrusion, the formation of solid deposits, particularly those consisting of lactame 12 (LC12), has a detrimental effect.

Other polyamides also tend to the formation of deposits when they are exposed to higher temperatures, e.g. during thermoplastic conversion. Depending on the type of polyamide these deposits are composed of varying parts of monomers, oligomers and various decomposition products emerging during processing.

Thus simple, cost saving measures are wanted to avoid the formation of solid deposits or coatings in the subsequent thermoplastic processing of polyamide moulding compositions which in particular are based on polyamide, particularly preferred polyamide 12 or a copolymer or polyamide respectively, which contains polyamide components, especially polyamide 12 components as well.

The generally used process to give polyamides and particularly polyamide 12 a higher standard of flexibility, elasticity and finish is to disperse plasticizers in larger amounts, i.e. more than 10% by weight. For polyamide 11 and polyamide 12 typical plasticizers such as sulfonamides, phenol derivatives and arylphosphites are suggested (see EP 0 748 847 B1). However, plasticizers in amounts well below 10% by weight are avoided, because with these low amounts brittleness and hardening of the polymers occurs ("Antiplasticizer-effect"). Only at higher concentration the plasticizers take effect (see Ullmanns Encyclopedia of technical chemistry, 4. Ed., Vol. 24, p. 357, "plasticizer").

U.S. Pat. No. 6,506,830 B1 describes antistatic polyamide moulding compositions with common plasticizers according to the state of the art. The plasticizer concentrations correspond to the usually high plasticizer concentrations (see claim 9; up to 30% by weight). Although U.S. Pat. No. 6,506,830 B1 claim 9 mentions a plasticizer amount of up to 30% by weight and therefore theoretically all concentrations are contained, it is well-known from the literature that small plasticizer additions are regarded as rather giving contrary results due to the "anti-plasticizer-effect" when considering an improvement of material properties. However, in the same context as the plasticizers lactames are mentioned which are the main cause for the formation of deposits.

EP 0 748 847 A2 describes common plasticizer containing polyamide moulding compositions recognisable by the high plasticizer concentrations (preferably 8 to 20% by weight). Furthermore, the advantageous use of plasticizer mixtures is described. The quoted plasticizers also contain sulfonamides and hydroxybenzoates. However, EP 0 748 847 A2 confines itself to the flexibility and cold impact strength of polyamides. Problems of solid deposits are not mentioned. In contrast to this the evaporation of the plasticizer is quoted as a disadvantage (see p. 2, 1. 58 to p. 3, 1. 3). EP 0 748 847 A2 mentions the surface of the mould, but only in the context of a "nontacky surface" which is in no conjunction with the described problems of solid deposits. Apart from that for plasticizers closest attention is paid to vitrification temperature. However, properties at room temperature or higher temperature which are required for the solubility of the polyamide specific solid deposits are not dealt with.

WO 97/10303 uses plasticizers at concentrations of up to 5% by weight for the improvement of welding properties or the increase of joint line strength of the polyamide moulding compositions. Sulfonamides are used as well. But in the same context as the use of plasticizers lactames are mentioned (see p. 4, 1. 35–36). But just the lactames are the cause of the solid deposits.

WO 01/05888 describes moulding compositions which contain, beside polyacetal, flame proving agents and N-containing compounds that can be low molecular. Sulfonamides and urea derivatives belong to these compounds too. The N-containing compounds strengthen the flame protection and increase the stability of the moulding compositions described. In their function as stabilizers concentrations of up to 2.5% are used.

In accordance with WO 01/05888 the moulding compositions must always contain polyacetal and this reference gives no hint to the described problems of solid deposits. This is plausible, because polyamides can be contained in polyacetal, but never play a dominant role there.

EP 0 388 583 A1 is aimed at the fact that the deteriorated cold impact strength of polyamide moulding compositions due to softening can be balanced by certain polyamides. Common plasticizer-containing polyamide moulding compositions are described here with up to 25% by weight plasticizers.

BRIEF SUMMARY OF THE INVENTION

Thus it is an object of the present invention is to provide thermoplastic polyamide moulding compositions, on which no solid deposits are formed during thermoplastic conversion.

DETAILED DESCRIPTION OF THE INVENTION

The present invention relates therefore to the use of thermoplastic polyamide moulding compositions with reduced or strongly reduced formation of solid deposits during thermoplastic conversion into items of practical use in discontinuous processes, in particular injection moulding, and continuous processes such as extrusion of films, fibers, tubes and jacketings. The polyamide moulding compositions according to the present invention contain:

(A) at least 20% by weight polyamide and/or at least one copolymer with at least 20% by weight polyamide components,
(B) 0.05% by weight up to maximum 3.0% by weight, preferably 0.1% up to 2.0% by weight, more preferably 0.15% by weight up to 1.0%, each related to the total mass of the polyamide matrix-component, at least one compound selected from the group consisting of benzene sulfonic acid alkylamides, o, p-toluene sulfonic acid alkylamides, alkylhydroxy benzoates, benzene carboxylic acid esters, phthalic acid esters, fatty acid esters, esters of polyhydric alcohols, dicarbonic acid diesters with a C-number from 12 to 44 atoms, trialkylmellitic acid esters, phosphoric acid esters, citric acid esters, tetra (2-hydroxyalkyl) alkylene diamines and mixtures of the afore mentioned compounds, and/or
(C) 0.05% by weight up to maximum 3.0% by weight, preferably 0.1% up to 2.0% by weight, more preferably 0.15% by weight up to 1.0%, each related to the total mass of the polyamide matrix-component, at least one aprotic compound selected from the group of N-alkylated, cyclic carbonic acid amides with 5 to 7 ring elements and/or the group of urea derivatives, the alkyl rests of which are linear or branched at the nitrogen and which, if necessary, can contain heteroatoms and heterogroups or which form a linking of the two N-atoms.

In accordance with the invention it was surprisingly found that by addition of those compounds (B) and/or (C) to be precise in the range of 0.05% by weight up to 3.0% by weight where actually an "anti-plasticizer" effect would be expected, the formation of solid deposits during the subsequent thermoplastic conversion can be strongly reduced or avoided.

Because of the simultaneous evaporation of monomers and/or oligomers and/or decomposition products of the polyamides and of the compounds (B) and/or (C) during thermoplastic conversion, no solid deposits condense on the colder moulds surfaces, but rather fine medium to low viscous droplets or liquid films which either flow away spontaneously or can be wiped away easily, or, if they remain at the surface, can also diffuse back into the polyamide mould. These films contain the monomers, oligomers or decomposition products sublimed from the polyamide matrix in dissolved, dispersed or suspended form. This way unwanted solid depositions, which during continuous processing for the given conditions give cause for encrustations or stress cracking, are converted into non disruptive or easily removable, low viscous coatings.

Compounds (B) and/or (C) have solubility parameters comparable with those of the used polyamide components and therefore are sufficiently compatible and polar, so that even the monomers, oligomers or decomposition products of polyamides can be partly or completely be removed. Because of the good compatibility of compounds (B) and (C) with the polyamide matrix and the subliming monomers, oligomers or decomposition products, even low concentrations of those additives are sufficient to prevent disruptive solid deposits.

Several of the compounds (B) and/or (C) in accordance with the invention can dissolve the sublimates emerged during processing due to their high reactivity. For example, proton donating parts of the sublimate are neutralized by (hydroxyalkyl)ethylenediamine. Thereby the otherwise hardly soluble dicarboxylic acids, e.g. terephthalic acid, can be brought into solution or at least into a dispersed form and thus the formation of solid deposits is prevented.

This is particularly advantageous with the so-called HT (high temperature)-polyamides which are based on 6T such as PA 6I/6T, because here by use of tetra(2-hydroxyalkyl) ethylenediamines, especially of N,N,N',N'-tetrakis(2-hydroxypropyl) ethylenediamine in accordance with the invention the dissolution of terephthalic acid through neutralization occurs.

In accordance with the invention the novel use of the deposit-reducing compounds (B) and/or (C) will not prevent from sublimation of rest monomers or oligomers remained in polyamide 12 or decomposition products formed during processing. However, the additional components of the composition are capable of liquefaction of these substances.

In accordance with the invention the thermoplastic polyamide moulding compositions are generally polyamide moulding compositions, based on hydrolytically produced polyamide or based on polyamide block copolymers, which may contain polyester-, polyether-, polysiloxane-, polycarbonate-, polyacrylate-, polymethacrylate-, or polyolefine segments as additional components beside a part of at least 20% polyamide components.

Advantageous embodiments are described by the sub claims.

Parts of the compounds (B) and/or (C), but also monomers and oligomers migrating to the surface during processing, experience diffusion back into the polyamide mould in the temperature range from e.g. 50° C. to 100° C. which are common conditions of practical use. This is considered unwanted behaviour. In the case of polyamide 12 this unexpected result may be explained in a way that compounds (B) and/or (C), particularly N-octylpyrrolidine, N-butylbenzenesulfonamide (BBSA) or N-butyltoluenesulfonamide dissolve in the polyamide 12 matrix and, since N-octylpyrrolidine is also capable of dissolving lactame 12, enable its diffusion back into the matrix. The compounds (B) and/or (C) are probably taking effect in such a way that the sublimation of lactame 12 is admittedly not prevented, however, instead of solid deposits fine, colourless and low viscous droplets are formed which spontaneously flow away, which can easily be wiped away, or, when remaining at the surface, diffuse back into the mould.

Thus the problem of solid deposits on polyamide moulding compositions, particularly polyamide 12 moulding compositions, and copolymers which contain at least 20% by weight polyamide components with regard to the polyamide matrix, can be solved to a large extent by purely amending a formulation for technical use. Therefore no additional processing steps and hence no additional thermal stress of the moulding compositions are necessary.

The compounds (B) and/or (C) in accordance to the invention prevent effectively at added amounts of 0.05 to 3% by weight in the polyamide matrix component the formation of solid deposits which is particularly caused by lactame 12. Preferred are added amounts of 0.1% by weight to 2.0% by weight, more preferred are added amounts of 0.15% by weight to 1.0% by weight.

Examples of phthalic acid esters for use as deposits-reducing additive, in the following abbreviated to "DRA", mainly include phthalic acid esters with phthalic acid esters with linear or branched $C_4$ to $C_{14}$ alcohols such as diethylphthalate, dibuthylphthalate, butyloctylphthalate, butylisodecylphthalate, diisooctylphthalate, dicaprylphthalate, n-octyl-n-decylphthalate, diethylphthalate, diisobutylphthalate, diheptylphthalate, di-2-ethylhexylphthalate, diisodecylphthalate, butylbenzylphthalate, diisononylphthalate, di-2-ethylhexyltetrahydrophthalate and dimethoxyethylphthalate.

Examples of fatty acid esters for use as "DRA" include di-2-ethylhexyladipate, diisodecyladipate, diisononyladipate, di-2-ethylhexylsebacate, di-2-ethylhexyl-azelate, bis-2-ethylhexyldodecandioate, bis-2-ethylhexylfumarate, dibutylmaleate, acetylbutyl-ricinoleate, tributylacetylcitrate and 2-ethylhexylacetate.

Examples of esters of polyvalent alcohols for use as "DRA" include 2,2,4-trimethyl-1,3-pentanediolmonoisobutyrate, 2,2,4-trimethyl-1,3-pentanedioldiisobutyrate, glycerine triacetate and glycerine tributyrate.

Examples of phosphoric acid esters for use as "DRA" include triphenylphosphate, cresyldiphenylphosphate, tricresylphosphate, trimethylphosphate, triethylphosphate, tributylphosphate, tri-2-ethylhexylphosphate, tributoxyethylphosphate and 2-ethylhexyldiphenylphosphate.

Examples of trimellitic acid esters for use as "DRA" include tribtuyltrimellitate, tri(2-ethylhexyl)trimellitate and tri(n-octyl)trimellitate.

Examples of the epoxy-plasticizer for use as "DRA" include di-n-octylepoxyhexahydrophthalate and di-2-ethylhexylepoxyhexahydrophthalate.

Preferred representatives of the above given "DRA" in accordance with the present invention include phthalic acid esters such as diisobutylphthalate, diheptylphthalate, di-2-ethylhexylphthalate und diisodecylphthalate, fatty acids such as di-2-ethylhexyladipate, isodecyladipate, di-2-ethylhexylsebacate and di-2-ethylhexylacetate, esters of polyvalent alcohols such as 2,2,4-trimethyl-1,3-pentanediolmonoisobutyrate und 2,2,4-trimethyl-1,3-pentanedioldiisobutyrate and phosphoric acid esters such as tributylphosphat, tri-2-ethylhexylphosphate and tributoxyethylphosphate.

More preferred of compounds of group (B) which are used preferably as "DRA" in the present invention are phthalic acid esters such as diisobutylphthalate, di-2-ethylhexyladipate, di-2-ethylhexylsebacate and di-2-ethylhexylacelate, polyvalent alcohols such as 2,2,4-trimethyl-1,3-pentanediolmonoisobutyrate and 2,2,4-trimethyl-1,3-pentanedioldiisobutyrate and phosphoric acid esters such as tri-2-ethylhexylphosphate.

Examples of the benzene sulfonic acid alkylamides for use as "DRA" include benzene sulfonic acid propylamide, benzene sulfonic acid butylamide and benzene sulfonic acid-2-ethylhexyl-amide.

Examples of toluene sulfonic acid alkylamides for use as "DRA" include N-ethyl-o- or N-ethyl-p-toluene sulfonic acid alkylamides and N-ethyl-o- or N-ethyl-p-toluene sulfonic acid-2-ethylhexylamide.

Examples of alkylhydroxybenzoate for use as "DRA" include ethylhexyl-o- or p-hydroxybenzoate, hexyldecyl-o- or p-hydroxybenzoate, ethyldecyl-o- or p-hydroxybenzoate, methyl-o- or p-hydroxybenzoate, butyl-o- or p-hydroxybenzoate, hexyl-o- or p-hydroxybenzoate, n-octyl-o- or p-hydroxybenzoate, decyl-o- or p-hydroxybenzoate, diethyleneglycoldibenzoate and dodecyl-o- or p-hydroxybenzoate.

Examples for dicarboxylic acid diesters are hexanedicarboxylic acid diesters, for example benzyloctyladipate (Adimoll BO®), dimethyladipate (Adimol DM®), nonadicarboxylic acid diester, for example di-n-hexylazelate (Edenol 9051®), decanedicarboxylic acid diester, for example dioctylsebacate (Edenol 888®).

Examples for trialkyltrimellitate are 1,2,4-benzenetricarboxylic-tris(alkylester), for example trioctyltrimellitate (Palatinol TOTM-I®).

One example for the used tetra(2-hydroxyalkyl)ethylendiamines is N,N,N',N'-tetrakis(2-hydroxypropyl)ethylendiamine (Quadrol®).

One example for penta(2-hydroxyalkyl)alkylenetriamine is Pentrol®, the addition compound of propyleneoxide and diethylenetriamine.

Preferred representatives of the above listed "DRA" in accordance with the present invention include benzenesulfonic acid alkylamides such as benzenesulfonic acid butylamide and benzenesulfonic acid-2-ethylhexylamide, toluenesulfonic acid alkylamides such as N-ethyl-p-toluenesulfonic acid butylamide and N-ethyl-p-toluenesulfonic acid-2-ethylhexylamide and alkylhydroxybenzoates such as ethylhexyl-p-hydroxybenzoate, hexyldecyl-p-hydroxybenzoate and ethyldecyl-p-hydroxybenzoate.

More preferred members of these include benzenesulfonic acid butylamide, ethylhexyl-p-hydroxybenzoate and hexyldecyl-p-hydroxybenzoate.

The "DRA" effectively prevents particularly at added amounts of 0.15% by weight to 1.0% by weight in the polyamide matrix from the formation of solid deposits.

The aprotic compound from the group of N-alkylated, cyclic carboxylic acid amides with 5–7 chain links preferably corresponds to a carboxylic acid amide of formular I:

where x is 1 to 3 and R1 an octyl residue, the octyl residue of which is linear or branched at the nitrogen and which is necessary, may contain heteroatoms and heterogroups or which form a linking of the two N-atoms. Suitable compounds are N-octylpyrrolidone and N-octylcaprolactam.

N-octylpyrrolidone, i.e. BBSA is in accordance with the present invention as an additive especially suitable. Lactam 12 and N-octylpyrrolidone have both a molecular mass of 197 g/mol and both are cyclic amides. Furthermore evaporate N-octylpyrrolidone, i.e. BBSA and lactam 12 in about the same range of temperature. While N-octylpyrrolidone, i.e. BBSA evaporates at high temperature, the diffusion back into the polyamide matrix occurs at temperatures from 100 to 150° C. A major difference of these compounds is the melting point. Lactam 12 has a melting point of 150° C. and is therefore a solid at room temperature, while N-octylpyrrolidone, i.e. BBSA is a liquid at room temperature. An essential property of N-octylpyrrolidone, i.e. BBSA with regard to the present invention is its capability to dissolve, i.e. to liquefy lactam 12. N-octylcaprolactam, i.e. BBSA show a similar behaviour to N-octylpyrrolidone, i.e. BBSA, with a slightly lower solubility for the lactam.

To ensure that during processing droplets and fine liquid films and no solid deposits are formed, not only a sufficient solubility of lactam in compound (B) and/or (C) is required, but also important is a volatileness of compound (B) and/or (C) adapted to the lactam, a sufficient solubility in the PA12 matrix and a convenient migration behaviour. A slightly higher or equivalent volatileness of the aprotic compound with regard to the lactame is advantageous. The volatileness should in no case be too high, so that the advantages with regard to the problem of solid deposits are not more than compensated by the disadvantages of a too strong emission formation.

Even at higher concentrations the use of compounds (B) and/or (C) in accordance with the invention does not lead to decomposition of the polyamide moulding compositions so that the mechanic properties remain complete.

Further preferably used compounds of group (C) are urea derivatives of formular II

II where R2 und R' can be different or identical, linear or branched and consisting of 1 to 8 C-atoms or each 2 R' can be an ethylene- or propylene bridge which connects the two N-atoms. More preferred is the compound in which R2 and R' are butyl residues.

Further particularly suitable are the cyclic N,N-dimethyl-ethylene- and -propylene-urea as well as tetrabutyl urea and mixtures of such urea derivatives. In a particularly preferred embodiment the urea derivatives are used as mixtures with the cyclic N-alkylcarbonamides. When the polyamide moulding compositions contain deposit reducing additives according to formula I and/or formula II, during thermoplastic processing at cold parts of tool or moulding surface at most low viscous, colourless droplets or liquid films are formed which flow or drop away or which can be easily wiped off, but no sticking coverings.

In a preferred embodiment the copolymer is essentially polyamide 12, particularly polyamide 12-blockcopolymer which is most preferably made by hydrolysis. Alternatively, the copolymer or the (co)polyamide respectively can be a polyamide mixture which, for example, is a polyamide alloy or a multiphase blend that, if necessary, also contains compatibilizers and/or impact strength modifiers. For example, it therefore may be a 2-phase polyamide mixture which consists of polyamide 12, a semiaromatic polyamide and, if necessary, a compatibilizer.

In an alternative embodiment the mould is a polyamide mixture of at least 20% by weight polyamide 12 and a semicrystalline (co)polyamide and/or amorphous copolyamide. Particularly preferred as (co)polyamide is a mixture of polyamide 12 and an amorphous copolyamide.

As additional polyamides (PA) for the polyamide mixtures in accordance with the invention are advantageously polyamides based on $C_6$–$C_{12}$-lactames or ω-aminocarbocarboxylic acids with 4 to 18 carbon atoms, preferred 6 to 12 carbon atoms, or polycondensates obtained from the polycondensation of at least one diamine from the group of aliphatic diamines with 4 to 18 C-atoms, cycloaliphatic diamines with 7 to 22 C-atoms in combination with at least one dicarboxylic acid from the group of aliphatic dicarboxylic acids with 4 to 44 C-atoms, cycloaliphatic dicarboxylic acids with 8 to 24 C-atoms and aromatic dicarboxylic acids with 8 to 20 C-atoms. The ω-aminocarboxylic acids or the lactames are selected from the group of ε-aminocapronic acid, 11-aminoundecane acid, 12-aminododecane acid, ε-caprolactam, enantholactam, laurinlactam. Furthermore, in accordance with the invention, it is possible to use mixtures of such polymerizates or polycondensates, respectively. Suitable diamines, in accordance with the invention, which are combined with a dicarboxylic acid, are, e.g. 2,2,4- or 2,4,4-trimethylhexamethylenediamine, 1,3- or 1,4-bis(aminomethyl)cyclohexane, bis(p-aminocyclohexyl)methane, m- or p-xylene diamine, 1,4-diaminobutane, 1,5-diamino-2-methylpentane, 1,6-diaminohexane, 1,8-diaminooctane, 1,9-diaminononane, 2-Methyl-1,8-diaminooctane, 1,10-diaminodecane, 1,12-diaminododecane, cyclohexyldimethylenediamine, and the dicarboxylic acids selected from the group of succinic acid, glutaric acid, adipic acid, suberic acid, pimelic acid, suberic acid, acelaic acid, sebacic acid, dodecanedicarboxylic acid, octadecanedicarboxylic acid, 4-cyclohexanedicarboxylic acid, terephthalic acid, isophthalic acid, and the naphthalene dicarboxylic acids.

Specific examples of the polyamides used in the context of the present invention and the additionally added (co)polyamides to the mixtures or alloys for the moulding compositions in accordance with the invention respectively, are therefore homo- and copolyamides from the group of PA 6, PA 66, PA 11, PA 46, PA 12, PA 1212, PA 1012, PA 610, PA 612, PA 69 PA 9T, PA 10T, PA 12T, PA 12I, mixtures thereof or copolymers based on monomers used. Preferred are, in accordance with the invention, also copolyamide PA 12T/12, PA 10T/12, PA 12T/106 and PA 10T/106. Furthermore are e.g. PA 6/66, PA 6/612, PA 6/66/610, PA 6/66/12, PA 6T/66, PA 6/6T, PA 6/6I, PA 6I/6T or mixtures thereof or mixtures such as PA 12/MACMI, PA 66/6I/6T, MXD 6/6 preferred polyamide moulding compositions as well.

In accordance with the invention the polyamide moulding compositions may also contain polyamide blockcopolymers, particularly polyamide 12-blockcopolymers which contain polyester-, polyether-, polysiloxane-, polycarbonate-, polyacrylate-, polymethacrylate- or polyolefin segments as further components beside a proportion of at least 20% polyamide components, particularly polyamide 12 components. Representatives of this class of polymers are polyether amides, polyetheresteramides und polyester amides.

In accordance with the invention the thermoplastic polyamide moulding compositions may further contain common, well-known to the expert additives solely or in combination, which are selected from the group, consisting of impact strength modifier, external polymer, bonding agents, flame retardants, reinforcing agents such as glass- and C-fibers, UV- or heat stabilizer, stabilizers against weathering, minerals, processing aids, crystallization accelerators or inhibitors, oxidation inhibitor, flowability agents, lubricants, mould removers, (flame retardants), pigments, dyes and marking agents and fillers such as carbon black or graphite or platelike nanoparticles, corresponding to all known additives for polyamides as they are necessary for each application.

For certain purposes to the previously described (co)polyamides or mixtures thereof may also be added other common polymers such as polyesters, polyolefines, polycarbonates, AN- and ABS polymerisates, functionalized copolyolefins and ionomers.

As further additives for the thermoplastic polyamide moulding compositions, in accordance with the invention, impact strength modifiers are used. For example, these are copolymers based on polyolefines of low glass temperature which may contain acrylic acid or which may be mould plugged with maleic acid anhydride. Particularly mentioned are impact strength modifiers such as ethylene-propylene-copolyolefines or ethylene-propylene-diene-caoutchoucs (EPDM) or acrylate caoutchoucs.

In preferred embodiments the moulding compositions further contain nanoscale fillers. In a particular embodiment of the invention the fillers are either silicon dioxide or silicon dioxide hydrates.

In one embodiment in the polyamide mould certain nanoscale fillers are available as an evenly dispersed, layered material. Before introducing them into the matrix, they have a layer thickness of 0.7 to 1.2 nm and an interlayer distance of the mineral sheets of up to 5 nm.

The compounds (B) and/or (C), in accordance with claim 1, containing a polar functional group and an apolar alkyl group may essentially facilitate the introduction of such fillers. When added to layered silicates, their polar group can function as a co-ordination site for the cation and thereby cause the interlayer distance to increase and therefore essentially improves and accelerates the separation of the primary particles and their distribution in the matrix.

Such minerals can be added at any step of the polymer manufacturing and be finely distributed on the nanometer scale. Preferred are minerals which already have a layered structure such as layered silicates, double hydroxides such as hydrotalcite or also graphite. Nanofillers based on silicones, silica or silsesquioxanes can be used as well.

In accordance with the invention 1:1 and 2:1 layered silicates are considered layered silicates. In these systems layers of $SiO_4$-tetrahedrons are connected with those of $M(O,OH)_6$-octahedrons in a regular way. M stands for metal ions such as Al, Mg, Fe. For the 1:1 layered silicates each tetrahedron layer is connected with one octahedron layer. Examples are kaolin- and serpentine minerals.

In one embodiment of the invention for the preparation of thermoplastic polyamide moulding compositions the "DRA" is given to granulates of (co)polyamide with at least 20% part of polyamide and mixed until the compound has diffused into the granulates. The mixing is preferably performed at higher temperatures, preferably at 50 to 160° C., more preferred at 60 to 120° C.

For example, the "DRA" can be applied as a liquid film to the granulates, after that, if necessary, further powdered additives are added, and then the extrusion following common, well-known procedures can take place.

Furthermore, it is possible to add the "DRA" immediately before polymerisation/polykondensation of the monomers or monomer mixture to the polyamide matrix or during the polymerisation/polycondensation to the polyamide reaction mixture. During the preparation of polyamide 12, for example, the "DRA" can be added to 12-aminolauric acid or lactam 12, and the resulting mixture is then, if necessary by adding at least one chain length regulator, polymerised. The resulting granulates can then be thermoplastically converted during injection moulding and extrusion processes.

If there is already an application related granulate based on (co)polyamide and during the processing of which problems due to solid deposits occur, then the "DRA" can be easily applied in suitable amounts for application as a liquid film on the granulate surface, after which, if necessary, thermal postprocessing can take place and thereby compounds (B) and/or (C) diffuse into the granulate, which thereby regains its good flowability, or suitable solid additives can be applied subsequently.

In a preferred embodiment of the invention the "DRA" (B) and/or (C) is continously incorporated during an extrusion run, preferably by use of a twin screw extruder, so-called ZSK, especially at the same time with further components of the formulation into the polyamide matrix of (co)polyamide with at least 20% polyamide. The aprotic compound can also be incorporated at higher concentrations (3 to 30% by weight) and the such produced granulate can be used as a masterbatch.

The polyamide moulding compositions, in accordance with the invention, are used for thermoplastic conversion into items of practical use in discontinuous processes, especially injection moulding, and continuous processes such as the extrusion of foils, fibers, tubes and jacketings, though the thermoplastic polyamide moulding compositions in accordance with the present invention are especially outstanding, because during thermoplastic conversion no solid deposits are formed.

The following examples shall explain the invention without imposing restrictions on it.

EXAMPLES

In the examples mean:

| abbreviation | indication |
| --- | --- |
| DRA | deposit reducing additive |
| NOP | N-octylpyrrolidone |
| NMP | N-methylpyrrolidone |
| BBSA | N-n-butylbenzolsulfonamide |
| LC12 | laurinlactam |
| PA12 | polyamide 12 |
| grilamide L20 nature | Medium viscous PA 12, base granulate, injection moulding quality by EMS-Chemie AG, CH-Domat/Ems, Switzerland |
| Grilamid L20G nature | Medium viscous PA 12 with lubricant by EMS-Chemie AG, CH-Domat/Ems |
| polyamide 12 Typ A | Medium viscous PA12; hydrolysis-, heat-, UV-resistant, black, by EMS-Chemie AG, CH-Domat/Ems |
| MVR (Melt Volume Index) | Melt Volume Index in accordance with EN ISO 1133 |
| VB | Example for comparison |
| $\eta_{rel}$ | relative solution viscosity of the polylactam, measured as 0.5% solution in m-cresole in accordance with EN ISO 3105 |

Examples 1, 2

(In Accordance with the Invention) and Example for Comparison 3: Corrugated Tube Extrusion of PA 12

To study the effect of the deposit reducing additives on the production of corrugated tubes a compound with 0.5% NOP and BBSA respectively in polyamide 12 Typ A was prepared and during endurance test compared with the base material (table 1). The material was extruded at 250° C. (Müller & Sohn AG, Rorbas) and processed to corrugated tube (Uniwell Corrugator) with a pull off speed of ca. 2 m/min and a mould baking temperature of 50° C. The compounds in accordance with the invention showed after 10 h only very few deposits at the evacuation slits, while with the pure PA12 without deposit reducing additive after already 1 hour LC12 deposit was formed which blocked the evacuation slits after 3 hours. The values for $\eta_{rel}$ show no reduction in example 1 and 2 which indicates that no polymer degradation occurs in presence of the deposit-reducing additives.

Examples 4 to 8

(In Accordance with the Invention) and Example for Comparison 9: Injection Moulding of PA12 with Deposit Reducing Additives On an injection moulding apparatus Krauss Maffei KM 50-55C studies on deposit formation by LC12 or additives respectively were conducted. A module for joint line tension bars was used as a tool, which had a nitrified exhauster inset with an vent depth of 0,01 mm. To estimate the minimum content of deposit reducing additive on which no solid deposits from LC12 in the injection moulding tool are formed, each 0.05%-, 0.07%-, 0.12%-, 0.25%-, and 0.80% by weight NOP or BBSA respectively were added to the Grilamid L20G natur and with an injection speed of 100 mm/s and a sharp mass temperature of 290° C. formed into tension bars. (table 2). With a too low content of "DRA" a deposit could be observed at the air vent slot of the tool, but with sufficient content no deposit was formed, but a thin, medium to low viscous colourless film which did not impair the injection moulding process in any way. From a content of at least 0.05 or 0.07% by weight respectively with NOP respectively and BBSA no solid LC12 deposits were formed. Without the use of the additive in accordance with the invention, the formation of a solid deposit is observed after even a few processing cycles.

Examples 11–16

Figure 1:
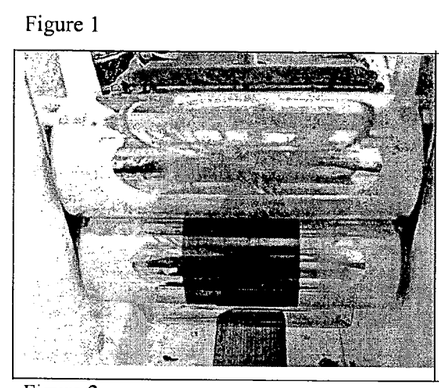
FIG. 1 shows the formation of solid deposits (1 minute) without the use of BBSA (N-n-butylbenzenesulfonamide) (prior art) (see example 10).
Figure 2:
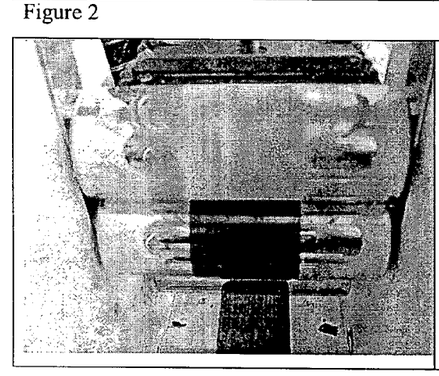
FIG. 2 shows the formation of solid deposits after ten minutes (prior art) (see example 10).

(In Accordance with the Invention) and Example for Comparison 10: Film Production on a Chill Roll On a twin screw-type extruding machine ZK 25 T by Collin, Ebersberg, Grilamid L20 natur was melted and pulled off as a film during which deposit formation was observed. The diameter of both of the co-rotating screws was 25 mm and the length/diameter ratio L/D=8/1. The granulate was dosed by a gravimetric dosing machine K-Tron K-SFS-24 with feed screw and melted on through five heating zones at 100, 230, 240, 240 und 240° C. The melt was withdrawn through a horizontal slit die (120 mm). The screw speed were 150 rpm with a throughput of 3 kg/h. The film was pulled off by a flat foil machine Collin Chill Roll Typ CR 72 T, flattened and coiled up. The first two cylinders were brought to the right temperature (20° C.) and closed. Afterwards the film went over a cooling cylinder and was coiled up. Without a deposit reducing additive solid deposits were formed on the upper chill roll within a few minutes. From time to time the deposits got off the roll and stick to the film (see FIG. 1 and FIG. 2).

Figure 3:
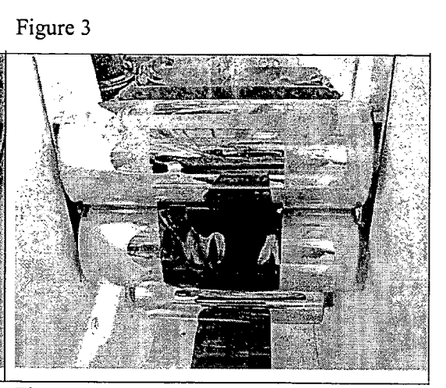
FIG. 3 shows the use of 0.75% by weight of BBSA after one minute according to the present invention (see example 16).
Figure 4:
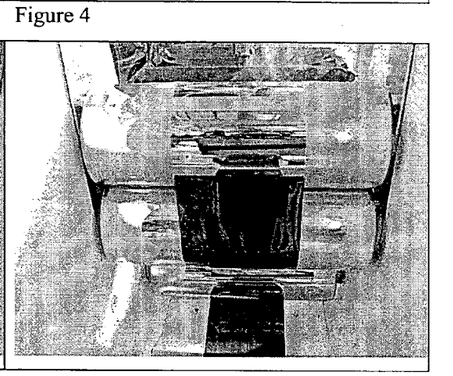
FIG. 4 shows the use of 0.75% by weight of BBSA after ten minutes according to the present invention (see example 16).

In subsequent tests different concentrations of NOP and BBSA were added to the polymer (examples 11–16, table 3). The deposits decreased with higher proportions of additive until a PA12 film without any LC12 deposit could be extruded at 0.5% by weight NOP or 0.75% by weight BBSA (see FIG. 3 and FIG. 4).

TABLE 1

Decomposition and processing behavior (corrugated tubes formation) of PA 12 with NOP and BBSA as additive for deposit reduction

| | | Example 1 | Example 2 | VB 3 |
|---|---|---|---|---|
| Base material | | Polyamide 12 Typ A | Polyamide 12 Typ A | Polyamide 12 Typ A |
| DRA | | BBSA | NOP | — |
| Proportion DRA | % by weight | 0.50 | 0.50 | — |
| $H_2O$ content | % by weight | 0.04 | 0.04 | 0.03 |
| LC 12 content | % by weight | 0.21 | 0.21 | 0.21 |
| MVR(275° C.,5 kg,4 min) | $cm^3$/10 min. | 18.0 | 21.0 | 10.5 |
| MVR (275° C., 5 kg, 20 min) | $cm^3$/10 min. | 20.0 | 23.0 | 12.5 |
| $\eta_{rel}$ (base granulate) | — | 2.32 | 2.32 | 2.35 |
| $\eta_{rel}$ (fusion cone, 4 min) | — | 2.32 | 2.32 | 2.40 |
| $\eta_{rel}$ (fusion cone, 20 min) | — | 2.30 | 2.30 | 2.42 |
| Permanent test corrugation tube formation | | | | |
| Deposits | | after 10 h only minor deposits | after 10 h only minor deposits | after 1 h already significant deposits |
| Blocking of vacuum slits | | >>10 h | >>10 h | after 3 h |

TABLE 2

Composition of the deposits formed during injection moulding with varied proportions of deposit reducing additive in Grilamid L20 G

| | Proportion DRA | Type of deposit by use of | |
|---|---|---|---|
| Example | [% by weight] | NOP | BBSA |
| 4 | 0.05 | highly viscous | medium viscous |
| 5 | 0.07 | medium viscous | medium viscous |
| 6 | 0.12 | lowly viscous | lowly viscous |
| 7 | 0.25 | lowly viscous | lowly viscous |
| 8 | 0.80 | lowly viscous | lowly viscous |
| VB 9 | 0.00 | Solid | |

TABLE 3

Deposit formation during film extrusion with varied proportions of deposit reducing additive in Grilamid L20

| Example | Proportion DRA [% by weight] | DRA | LC12 deposit on chill roll |
|---|---|---|---|
| VB 10 | — | — | very thick deposit |
| 11 | 0.15 | NOP | light deposit |
| 12 | 0.25 | NOP | light deposit |
| 13 | 0.50 | NOP | thin, colourless film |
| 14 | 0.25 | BBSA | light deposit |
| 15 | 0.50 | BBSA | light deposit |
| 16 | 0.75 | BBSA | thin, colourless film |

The invention claimed is:

1. A thermoplastic polyamide moulding composition with reduced or strongly reduced formation of solid deposits during a thermoplastic conversion into commodity goods in discontinuous processes and continuous processes, the compositions comprising:
   (A) at least 20% by weight polyamide and/or at least one copolymer containing at least 20% by weight polyamide structural units;
   (B) 0.05% by weight related to the polyamide portion up to maximum 3.0% by weight related to the polyamide portion of at least one compound, each related to the polyamide portion of the moulding composition, the at least one compound selected from the group consisting of benzene sulfonic acid alkylamides, o-, p-toluene sulfonic acid alkylamides, alkylhydroxy benzoates, benzene carboxylic acid esters, phthalic acid esters, fatty acid esters, esters of polyhydric alcohols, dicarboxylic acid diesters with a C-number from 4 to 44 atoms, trialkylmellitic acid esters, phosphoric acid esters, citric acid esters, tetra (2-hydroxyalkyl) alkylene diamines, and trialkylamines, and/or
   (C) 0.05% by weight up to maximum 3.0% by weight of at least one aprotic compound, each related to the polyamide portion of the moulding composition, the at least one aprotic compound selected from the group consisting of N-alkylated, cyclic carboxylic acid amides with 5 to 7 ring elements where the carboxylic acid amides correspond to formula I, where x is 1 to 3 and R1 an octyl residue, wherein the octyl residue is linear or branched at the nitrogen and may contain heteroatoms and heterogroups.

2. The thermoplastic polyamide moulding composition according to claim 1, characterized in that compound (B) is contained in amounts of 0.1 to 2.0% by weight and that for compound (B) an N-buylbenzene sulfonic acid amide is used as the benzene sulfonic acid alkylamide.

3. The thermoplastic polyamide moulding composition according to claim 1, characterized in that an N-butyltoluene sulfonic acid amide is used as the ortho- or the, para-toluene sulfonic acid alkylamide.

4. The thermoplastic polyamide moulding composition according to claim 1, characterized in that an N,N,N',N'-tetrakis(2-hydroxypropyl) ethylendiamine is used as the tetra (2-hydroxyalkyl) alkylene diamines.

5. The thermoplastic polyamide moulding composition according to claim 1, characterized in that the carboxylic acid amide is an N-octylpyrrolidone.

6. The thermoplastic polyamide moulding composition according to claim 1, characterized in that the at least one aprotic compound is selected from the group consisting of N-octylpyrrolidone, and N-octylcaprolactam.

7. The thermoplastic polyamide moulding composition according to claim 1, characterized in that the polyamide or the copolymer is essentially a polyamide which is selected from the group consisting of PA 6, PA 66, PA 11, PA 12, PA 46, PA 1212, PA 1012, PA 610, PA 612, PA 69, PA 9T, PA 10T, PA 12T, and PA 12I, and copolyamides based on monomers used in the above polyamides and copolyamides based on polyamide 12, PA 6T/66, PA 6/6T, PA 6/6I, PA 6I/6T and a PA 12/MACMI mixture, a PA 66/6I/6T mixture, a MXD 6/6 mixture, where also dimerised fatty acids with 36 and 44 C-atoms can be used as monomers.

8. The thermoplastic polyamide moulding composition according claim 1, characterized in that the polyamide is a hydrolytically fabricable polyamide 12.

9. The thermoplastic polyamide moulding composition according to claim 1, characterized in that the copolymer is a polyamide blockcopolymer, wherein the polyamide blockcopolymer includes a polyamide 12-blockcopolymer which comprises polyester-, polyether-, polysiloxane-, polycarbonate-, polyacrylate-, polymethacrylate- or polyolefin segments as further components beside a proportion of the at least 20% by weight polyamide structural units.

10. The thermoplastic polyamide moulding composition according to claim 1, characterized in that the polyamide portion of the moulding composition is a multi-phase blend comprising at least two polyamides comprising a polyamide selected from the group consisting of PA 6, PA 66, PA 11, PA 12, PA 46, PA 1212, PA 1012, PA 610, PA 612, PA 69, PA 9T, PA 10T, PA 12T, and PA 12I, and copolyamides based on monomers used in the above polyamides and copolyamides based on polyamide 12, PA 6/6T, PA 6/6I, and PA 6I/6T and PA 6T/66, PA 6/6T, PA 6/6I, PA 6I/6T, and a PA 12/MACMI mixture, a PA 66/6I/6T mixture, a MXD 6/6 mixture, PA 6/6T, PA 6/6I, PA 6I/6T and mixtures of materials selected from the group consisting of PA 6/6T, PA 6/6I and PA 6I/6T, where also dimerised fatty acids with 36 and 44 C-atoms can be used as monomers.

11. The thermoplastic polyamide moulding composition according to claim 10, characterized in that the polyamide blend is a two-phase blend.

12. The thermoplastic polyamide moulding composition according to claim 11, characterized in that the polyamide blend is a polyamide blend of polyamide 12 and an amorphous copolyamide or a semicrystalline polyamide.

13. The thermoplastic polyamide moulding composition according to claim 1, characterized in that the composition further comprises common additives solely or in combination, which are selected from the group consisting of impact strength agents, other polymers, bonding agents, compatibilizers, flame proofing agents, reinforcing agents, stabilizers against decomposition by light, stabilizers against decomposition by heat, stabilizers against decomposition by weathering, minerals, processing aids, dyes and carbon black.

14. The thermoplastic polyamide moulding composition according to claim 1, characterized in that the composition comprises nanoscale fillers.

15. The thermoplastic polyamide moulding composition according to claim 1, characterized in that compound (B) and/or (C) is applied to a granulate of the compound (A) at a higher temperature, and is mixed until the compound has diffused into the granulate.

16. The thermoplastic polyamide moulding composition according to claim 15, characterized in that the composition is used in a range of a room temperature up to 160° C.

17. The thermoplastic polyamide moulding composition according to claim 16, characterized in that the composition is used at 60 to 160° C.

18. The thermoplastic polyamide moulding composition according to claim 1, characterized in that the thermoplastic polyamide moulding composition is formed by adding granulate of a masterbatch to a polyamide moulding composition in such a ratio that the compound (B) and/or (C) were diluted to a concentration in the range of 0.05 to 3.0% by weight, wherein compound (B) and/or (C) were first incorporated in high amounts of 3 to 30% by weight into a polyamide to form said masterbatch.

19. The thermoplastic polyamide moulding composition according to claim 1, characterized in that compound (B) and/or (C) were added continuously during an extrusion run, simultaneously with the addition of further components selected from the group consisting of impact strength agents, other polymers, bonding agents, compatibilizers, flame proofing agents, reinforcing agents, stabilizers against decomposition by light, stabilizers against decomposition by heat, stabilizers against decomposition by weathering, minerals, processing aids, dyes and carbon black.

20. Commodity goods in form of films, fibers, tubes, jacketings and injection moulding parts produced according to claim 19.

21. Commodity goods in form of films, fibers, tubes, jacketings and injection moulding parts made from moulding compositions according to claim 1.

22. The thermoplastic polyamide moulding composition according to claim 1, characterized in that the discontinuous process is injection moulding.

* * * * *